United States Patent
Patel et al.

(10) Patent No.: US 12,183,340 B2
(45) Date of Patent: Dec. 31, 2024

(54) INTENT IDENTIFICATION FOR DIALOGUE SUPPORT

(71) Applicants: SONY INTERACTIVE ENTERTAINMENT LLC, San Mateo, CA (US); SONY INTERACTIVE ENTERTAINMENT INC., Tokyo (JP)

(72) Inventors: Benaisha Patel, San Mateo, CA (US); Alessandra Luizello, San Mateo, CA (US); Olga Rudi, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

(*) Notice: Subject to any disclaimer, the term of this patent is extended or adjusted under 35 U.S.C. 154(b) by 188 days.

(21) Appl. No.: 17/870,510

(22) Filed: Jul. 21, 2022

(65) Prior Publication Data
US 2024/0029726 A1 Jan. 25, 2024

(51) Int. Cl.
*G10L 15/22* (2006.01)
*G10L 15/08* (2006.01)
*G10L 15/30* (2013.01)

(52) U.S. Cl.
CPC .............. *G10L 15/22* (2013.01); *G10L 15/08* (2013.01); *G10L 15/30* (2013.01)

(58) Field of Classification Search
CPC ......... G10L 15/22; G10L 15/08; G10L 15/30; G06F 3/013; G06F 3/017;
(Continued)

(56) References Cited

U.S. PATENT DOCUMENTS

| 7,373,300 B1 | 5/2008 | Bangalore et al. |
| 9,858,925 B2 * | 1/2018 | Gruber .................... G10L 15/18 |

(Continued)

FOREIGN PATENT DOCUMENTS

| WO | WO 2024/019817 | 1/2024 |
| WO | WO 2024/019818 | 1/2024 |

OTHER PUBLICATIONS

International Search Report and Written Opinion issued on Aug. 15, 2023 for International Application No. PCT/US2023/023866 (15 Pages).

(Continued)

*Primary Examiner* — Fariba Sirjani
(74) *Attorney, Agent, or Firm* — Polsinelli LLP (57) ABSTRACT

Systems and methods of intent identification for customized dialogue support in virtual environments are provided. Dialogue intent models stored in memory may each specify one or more intents each associated with a dialogue filter. Input data may be received from a user device of a user. Such input data may be captured during an interactive session of an interactive title that provides a virtual environment to the user device. The input data may be analyzed based on the intent models in response to a detected dialogue trigger and may be determined to correspond to one of the stored intents. The dialogue filter associated with the determined intent may be applied to a plurality of available dialogue outputs associated with the detected dialogue filter. A customized dialogue output may be generated in accordance with a filtered subset of the available dialogue outputs.

21 Claims, 5 Drawing Sheets

(58) Field of Classification Search
CPC .. G06F 2203/0381; G06F 3/011; G06F 3/167; A63F 13/35; A63F 13/87
See application file for complete search history.

(56) References Cited

U.S. PATENT DOCUMENTS

| | | |
|---|---|---|
| 2004/0186730 A1 | 9/2004 | Sun et al. |
| 2007/0226648 A1 | 9/2007 | Hudson et al. |
| 2014/0188480 A1* | 7/2014 | Bangalore ............... G10L 13/02 704/260 |
| 2014/0201629 A1 | 7/2014 | Heck |
| 2015/0078562 A1 | 3/2015 | Shanmigasundaram et al. |
| 2015/0220512 A1* | 8/2015 | Heinemeyer ........... G06F 40/58 704/2 |
| 2015/0309561 A1* | 10/2015 | Stewart ..................... G06F 3/01 345/156 |
| 2016/0091967 A1* | 3/2016 | Prokofieva .............. G10L 17/22 345/156 |
| 2017/0300462 A1* | 10/2017 | Cudworth ............. G06F 40/274 |
| 2017/0358301 A1 | 12/2017 | Raitio et al. |
| 2018/0129484 A1 | 5/2018 | Kannan et al. |
| 2018/0277133 A1* | 9/2018 | Deetz ..................... H04M 3/568 |
| 2018/0286392 A1* | 10/2018 | Min ........................ G06F 3/017 |
| 2018/0332169 A1 | 11/2018 | Somech et al. |
| 2018/0356957 A1* | 12/2018 | Desjardins ............ G06F 40/274 |
| 2019/0066668 A1* | 2/2019 | Lin ......................... G10L 15/22 |
| 2019/0321725 A1* | 10/2019 | Zimring ................ A63F 13/323 |
| 2020/0007474 A1 | 1/2020 | Zhang et al. |
| 2020/0152184 A1 | 5/2020 | Steedman Henderson et al. |
| 2020/0160861 A1 | 5/2020 | Lee |
| 2020/0218780 A1 | 7/2020 | Mei et al. |
| 2020/0342223 A1 | 10/2020 | Mixter et al. |
| 2021/0151070 A1 | 5/2021 | Binder et al. |
| 2024/0029725 A1 | 1/2024 | Fryer-Mcculloch et al. |
| 2024/0029726 A1* | 1/2024 | Patel ....................... G06F 3/011 |

OTHER PUBLICATIONS

International Search Report and Written Opinion issued on Aug. 23, 2023 for International Application No. PCT/US2023/023872 (17 Pages).

* cited by examiner

INTENT IDENTIFICATION FOR DIALOGUE SUPPORT

BACKGROUND OF THE INVENTION

1. Field of the Invention

The present invention generally relates to intent identification. More specifically, the present invention relates to intent identification for customized dialogue support in virtual environments.

2. Description of the Related Art

Presently available digital content (e.g., video games) may allow for interaction with other users within a virtual environment. Thus, many users may enjoy playing such digital content titles in social settings that allow for competitive gameplay, team gameplay, and other social interactions with other users (e.g., friends, teammates, competitors, spectators). Such social interaction—which may include text-based, voice, or video chat—may take place on one or more different platforms (e.g., game platform server, lobby server, chat server, other service provider). Thus, the users in the same interactive session may have different options for communicating with each other, as well as interacting with the virtual environment. Such communications may not only enhance success in gameplay, but enhances social relationships and enjoyment of the interactive content title as well.

Some interactive content titles allow for numerous players to engage with each simultaneously within an in-game virtual environment. In addition, the virtual environment may include a number of in-game events occurring at a fast pace, thereby requiring users to react quickly in order to succeed in gameplay. Thus, efficient and effective player communication may be crucial to successfully navigate increasingly complex virtual environments. Some users, however—particularly those with stutters, lisps, or other speech or verbal fluency conditions and disabilities affecting speech or verbalization—may face obstacles or otherwise have difficulty in communicating effectively at the pace of others. As a result, such communication obstacles and difficulties may adversely affect their gameplay success, enjoyment, and social experience with an interactive game title.

There is, therefore, a need in the art for improved systems and methods of intent identification for customized dialogue support in virtual environments.

SUMMARY OF THE CLAIMED INVENTION

Embodiments of the present invention include systems and methods of intent identification for customized dialogue support in virtual environments. Dialogue intent models stored in memory may each specify one or more intents each associated with a dialogue filter. Input data may be received from a user device of a user. Such input data may be captured during an interactive session of an interactive title that provides a virtual environment to the user device. The input data may be analyzed based on the intent models in response to a detected dialogue trigger and may be determined to correspond to one of the stored intents. The dialogue filter associated with the determined intent may be applied to a plurality of available dialogue outputs associated with the detected dialogue filter. A customized dialogue output may be generated in accordance with a filtered subset of the available dialogue outputs.

DETAILED DESCRIPTION

Embodiments of the present invention include systems and methods of intent identification for customized dialogue support in virtual environments. Dialogue intent models stored in memory may each specify one or more intents each associated with a dialogue filter. Input data may be received from a user device of a user. Such input data may be captured during an interactive session of an interactive title that provides a virtual environment to the user device. The input data may be analyzed based on the intent models in response to a detected dialogue trigger and may be determined to correspond to one of the stored intents. The dialogue filter associated with the determined intent may be applied to a plurality of available dialogue outputs associated with the detected dialogue filter. A customized dialogue output may be generated in accordance with a filtered subset of the available dialogue outputs.

Figure 1:
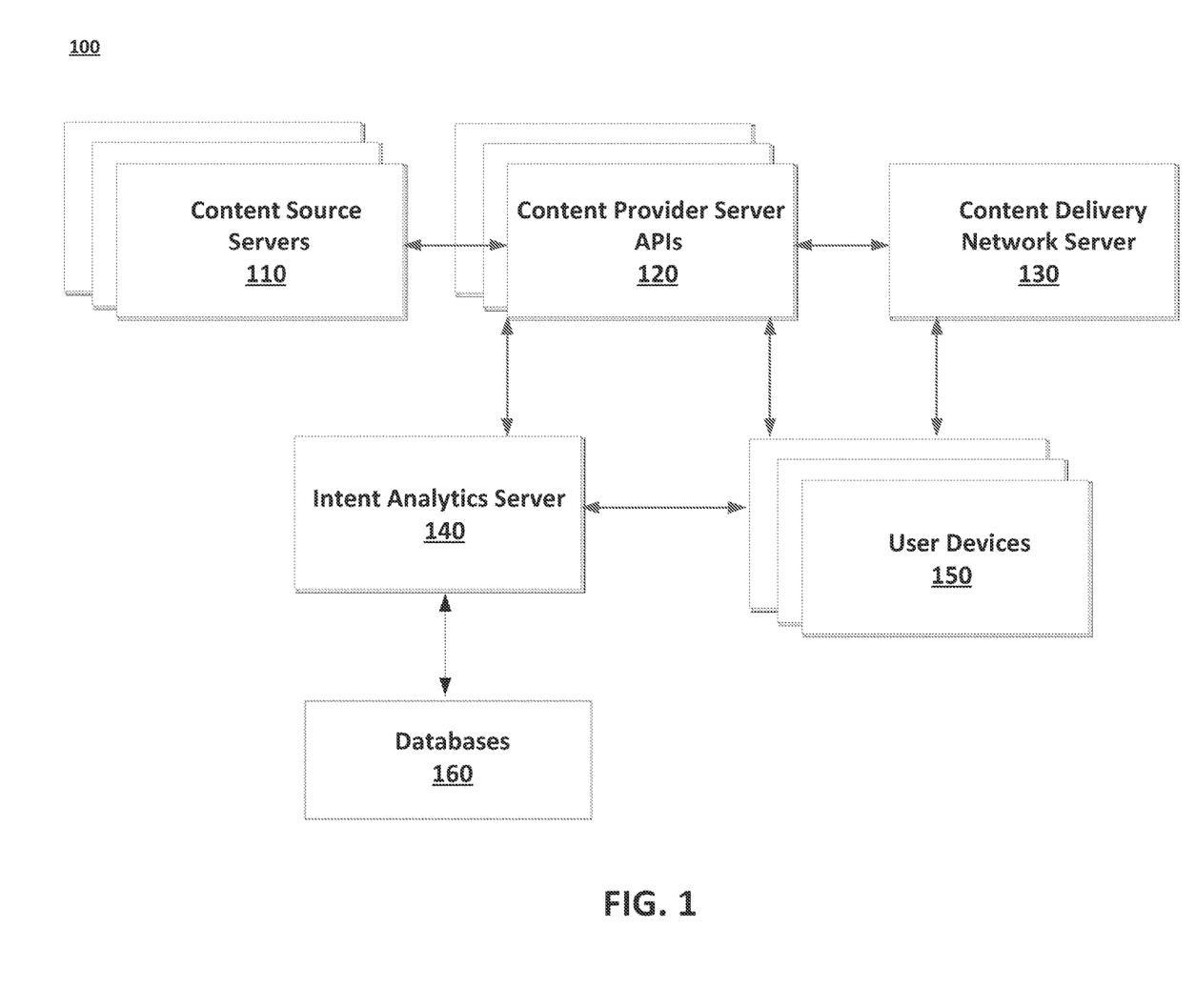
FIG. 1 illustrates a network environment in which a system of intent identification for customized dialogue support in virtual environments may be implemented.

FIG. 1 illustrates a network environment 100 in which a system of intent identification for customized dialogue support in virtual environments may be implemented. The network environment 100 may include one or more content source servers 110 that provide digital content (e.g., games, other applications and services) for distribution, one or more content provider server application program interfaces (APIs) 120, content delivery network server 130, intent analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different interactive content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent and/or associated with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, intent analytics server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Intent analytics server 140 may include any data server known in the art that is capable of communicating with the different content source servers 110, content provider server APIs 120, content delivery network server 130, user devices 150, and databases 160. Such intent analytics server 140 may be implemented on one or more cloud servers that carry out instructions associated with interactive content (e.g., games, activities, video, podcasts, User Generated Content ("UGC"), publisher content, etc.). The intent analytics servers 140 may further carry out instructions, for example, for storing one or more dialogue intent models in memory each specifying one or more intents each associated with a dialogue filter, receiving input data that is captured during an interactive session of an interactive title that provides a virtual environment to the user device 150, analyzing the input data based on the intent models in response to a detected dialogue trigger in order to determined that the input data corresponds to one of the stored intents, applying the dialogue filter associated with the determined intent to a plurality of available dialogue outputs associated with the detected dialogue filter, and generating a customized dialogue output in accordance with a filtered subset of the available dialogue outputs.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

While pictured separately, the databases 160 may be stored on any of the servers and devices illustrated in network environment 100 on the same server, on different servers, or on any of the user devices 150. Such databases 160 may store or link to various sources and services used for intent analytics and intent-based customization dialogue output generation. In addition, databases 160 may store dialogue intent models, which may be specific to a particular user, user group or team, user category or condition, themes, content genre, content title, sound types, etc. Dialogue intent models may be developed and refined over time for use in identifying real-time intents and to apply associated dialogue filters to generate intent-based customization of dialogue output that replaces certain speech and/or provides speech assistance or support to the user.

In some implementations, dialogue intent models may be newly generated, stored in databases 160, and retrieved as needed to analyze user input. Such dialogue intent models may also be further customized to the specific needs and preferences of an individual user. Thus, dialogue intent models may also be stored in the databases 160 in association with each user for whom the dialogue intent models are customized. Each dialogue intent model may include at least one intent associated with a dialogue filter. As used herein, intent refers to intended communication by the user. Players participating in a given in-game activity of a game title may tend to use certain communications and phrasing repeatedly in order to succeed or achieve a desired outcome. A dialogue intent model—which may be specific to the player or to the game title—represents common communication patterns used at different points in time and locations within the virtual environment. As such, intents may also be correlated with patterns of gameplay data (e.g., user progress in an activity and/or media content title, user ID, user game characters, etc.) or other parameters. The dialogue intent model may further specify that the intent is associated with a type of dialogue filter, which is a parameter executable to narrow down a universe of available dialogue output to a subset. For example, when an intent to participate in a race or search for treasure is identified, such intent may be used to filter out unrelated dialogue outputs and identify a subset of dialogue outputs that are related race participation or treasure hunt. Thus, customized dialogue output may be generated based on the filtered subset in accordance with the identified intent.

The dialogue intent models may be built and continually refined to identify new communication patterns in relation to in-game events, activities, challenges, actions, and conditions. Different models may be developed for different users, as well as different game titles, series of titles, genres, etc. Such dialogue intent models may be used not only to identify when certain speech sounds matches or partially matches a certain communication pattern, but also to predict when the intended communication is likely to occur based on data regarding the current interactive session, user actions leading up a current moment, other in-game events and conditions. Artificial intelligence and machine learning techniques may continually refine such models over time as more data is gathered regarding the user or similarly-situated users, as well as new game titles. The dialogue intent models may also be used to analyze new users and make recommendations as to which models may be most applicable to the characteristics and conditions associated with the user and current interactive session.

For example, certain users with certain speech conditions may find certain sounds, words, or phrases difficult to verbalize. In the context of a game or other interactive activity, the inability to speak effectively to other players in the current game session may represent an accessibility barrier that prevents the user from succeeding at or enjoying session interaction. Such a user may preconfigure customized dialogue maps with dialogue triggers corresponding to sounds, words, or phrases that are particularly challenging to the user (or users having a common speech condition). The dialogue triggers may not necessarily be the sounds, words, or phrases themselves, but rather associated indicators that such sounds, words, or phrases may need to be spoken. In addition, the dialogue trigger may also include physical gestures (e.g., captured by a camera, motion detector, or other sensor) or controller-based inputs (e.g., entered using a game controller, keyboard, keypad, touchscreen, or other input devices), which allow the user to indicate when the user predicts or identifies that a predetermined sound, word, or phrase will need to be spoken. Such mapped inputs may therefore serve as a custom shortcut command to implement associated dialogue support options. The intent models may further be applied to filter different possible dialogue output in a more targeted way (e.g., directed to a specific location, object, or character) within the virtual environment. Thus, the implementation of the customized dialogue output may be refined and wielded with more specificity than would be possible without intent identification.

The user may also preconfigure corresponding dialogue filters that are executable to process the portion of the session stream including the detected dialogue trigger in customized ways. For example, the dialogue filter may refer to specific pre-recorded speech audio clips by the user (or other users, computer-generated voices, or combinations of the same) or preconfigured text messages, which may also be stored in databases and retrieved as needed in accordance with the associated dialogue trigger and intent. In some implementations, the customized dialogue output may correspond to verbal commands that are part of the game or challenge. Intent-based filtration—particularly in combination—of available outputs may therefore allow for more specific verbal commands and controls.

In exemplary implementations, different input devices associated with a user device 150 may be used to capture user input. Such input devices may include, for example, keyboards, keypads, touchscreens, footpads, head-mounted and other sensors and cameras, etc. Such input devices may be used in combination to capture different types of input, including key-based, touch-based, direction-based, movement-based, gesture-based, gaze-based, and other data indicative of different user intents. For example, certain keys, buttons, or tap/swipe/gesture directions may be pre-configured to indicate different intents in relation to current in-game events in the virtual environment.

During an interactive session, such input devices may be used to capture input data, which may then be analyzed by intent analytics server 140 in accordance with one or more of the dialogue intent models, the selection of which may be based on user preference or analytics that match the user with dialogue intent models selected by or for similar users playing the same or similar games. Incoming input data may be assessed in relation to current (or immediately prior) in-game events to identify one or more intents. Where input may be received from multiple different input devices, multiple corresponding intents may be identified, and the associated dialogue filters may be applied. For example, a button press indicative of selection may be combined with gaze-tracking data that is directed to particular object or location within the virtual environment. Thus, dialogue output options may be filtered to identify those that are associated with selection of the object or location. The dialogue output options may also be based on current in-game data, for example, teammates within a vicinity of an avatar of the monitored user. A custom dialogue output may therefore be generated by combining or compiling multiple different words, phrases, and pre-recorded clips into a command or communication provided within the virtual environment. The user may further provide additional feedback regarding the intent, associated input, or dialogue filters in order to customize one or more of the intent models in accordance with their own personal needs and preferences.

Figure 2:
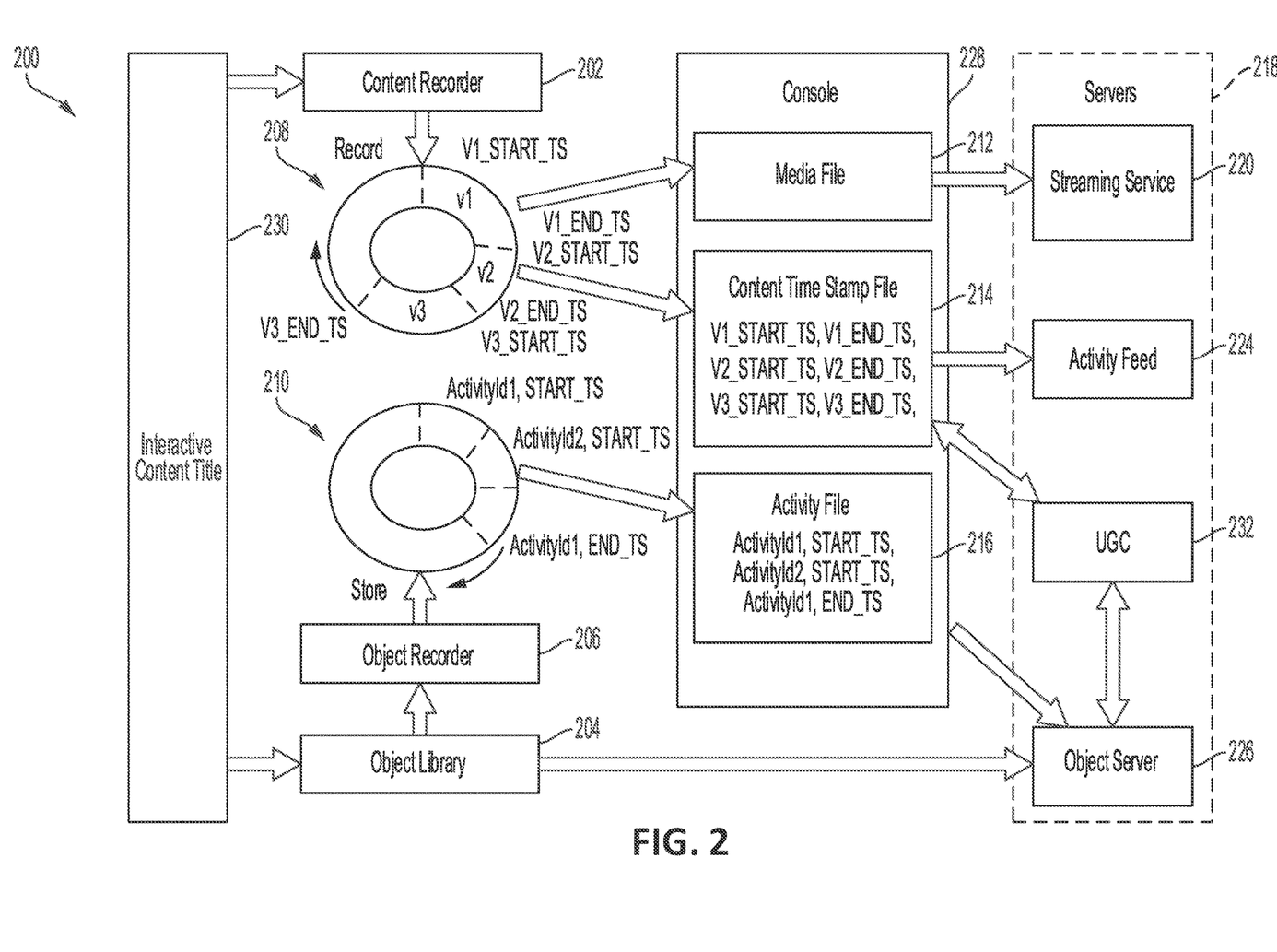
FIG. 2 illustrates an exemplary uniform data system (UDS) that may be used to provide data to a system for intent identification for customized dialogue support in virtual environments.

FIG. 2 illustrates an exemplary uniform data system (UDS) 200 that may be used to provide data to a system for customized dialogue support in virtual environments. Based on data provided by UDS 200, intent analytics server 140 can be made aware of the current session conditions, e.g., what in-game objects, entities, activities, and events that users have engaged with, and thus support analysis of and coordination of customized dialogue support by intent analytics server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to intent analytics server 140 regarding current session conditions, which may also be used as another basis for filtering the possible dialogue output options in accordance with likely intent in real-time. Intent analytics server 140 may therefore use such media files 212 and activity files 216 to identify specific conditions of the current session, including in-game events, objectives, other players, characters, and objects at specific locations. Based on such files 212 and 216, for example, intent analytics server 140 may identify a significance of the in-game event (e.g., significant battles, proximity to breaking records), which may be used to interpret user intent within a particular scene and to filter available dialogue output options for suitability to current status. Such session conditions may drive how the dialogue output options may be prioritized, thereby resulting in decisions as to which dialogue output options are filtered out or included in the resulting subset used to generate the customized dialogue output.

Figure 3:
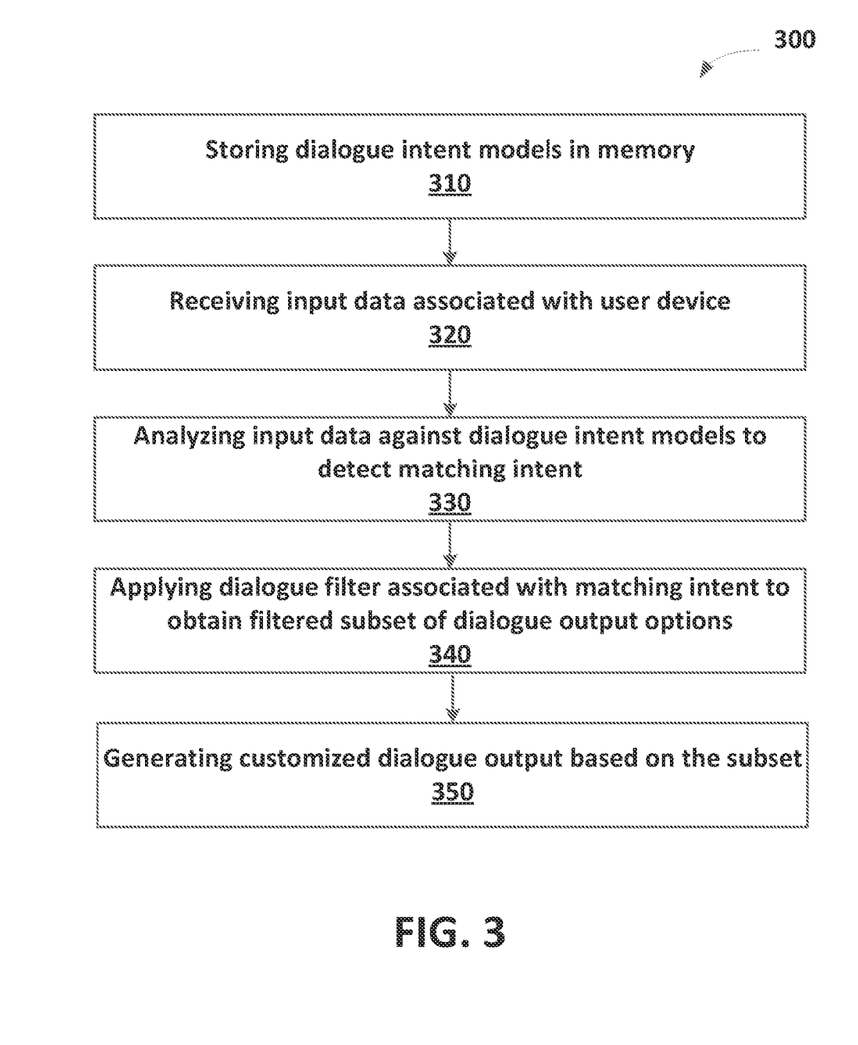
FIG. 3 is a flowchart illustrating an exemplary method of intent identification for customized dialogue support in virtual environments.

FIG. 3 is a flowchart illustrating an exemplary method 300 intent identification for for customized dialogue support in virtual environments. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, dialogue intent models may be stored in memory (e.g., databases 160). The dialogue intent model may include one or more predetermined intents and associated dialogue filters executable to identify a subset of dialogue output options used to generate a custom dialogue output. Different users may be matched to different dialogue intent models, which may be further customized to each user based on preference or habits. For example, a user may specify a selected input type as indicating a selected intent within a custom dialogue intent model, and intent analytics server 140 may use the custom dialogue intent model to identify when the selected input type has been received. In some instances, a new user may develop a new dialogue intent model or customize a current dialogue intent model in accordance with their own characteristics, preferences, and priorities in relation to different dialogue filters to apply, for example, to available recordings. Intent analytics server 140 may also query the new user in order to identify how to generate the custom dialogue intent model, or to customize specific dialogue intents or filters in an existing dialogue intent model. Dialogue intent models may also be specific to different game titles or genre, correlating different types of dialogue inputs with words and phrases commonly used in relation to such game titles and genres. As discussed above, a different set of dialogue intent models may be stored for each user.

In step 320, input data associated with the user device 150 may be monitored by intent analytics server 140. A user device 150 of the user may be associated with a variety of different input devices, each of which may be capable of providing different types of input where each different type may be preconfigured in association with selected intents and dialogue filters. One or more microphones in the real-world environment of the user and associated with the user device 150 (e.g., embedded in headphones, controllers, video cameras) may capture different inputs and provide to intent analytics server 150 for analysis. The intent analytics server 140 may monitor all such input data based on one or more dialogue models selected for the user.

In step 330, the input data may be analyzed by intent analytics server 140 against the selected dialogue intent model(s) when a dialogue trigger is detected or predicted. In particular, different intents (and/or indicators thereof) may be identified within the received input data. For example, certain inputs from different input devices may be received and analyzed to identify specific types. Footpad input, for example, may be analyzed to identify whether the input was received at the 10 o'clock or 2'o'clock position. Different button presses may be similarly analyzed. Once an intent is identified, the dialogue intent model(s) may be consulted to determine which dialogue filter(s) may be retrieved for application to available dialogue output options.

In step 340, the retrieved dialogue filter(s) may be applied to a current set of available dialogue output options, which may be identified based on in-game data regarding the monitored user, their teammates or opponents, and other characters, objects, and elements of the virtual environment, as well as overall game narrative, level, location, events, or objectives. As noted above, dialogue intent models may be built and refined based on data regarding communication patterns across multiple players, multiple sessions, and multiple games. Such communication patterns may correlate a certain intent with a set of dialogue output options. Because details may differ from session to session—e.g., due to different locations, actions, and points of view of the user's avatar—intent-based dialogue filters may be used to reduce the dialogue output options into a subset of the most applicable options.

In step 350, a custom dialogue output may be generated based on the subset of dialogue output options. The subset of dialogue output options may be processed, combined, compiled, or otherwise processed to generate custom dialogue output. Various sound processing techniques may be applied in accordance with express or indicated user preferences. The resulting custom dialogue output may be in the form of substitute or supplemental speech by a pre-recorded clip of the user's own natural voice, as well as other pre-recorded or computer-generated voices and sounds, which are provided to the other user devices in the same interactive session in place of the identified or predicted dialogue trigger. The customized dialogue output may then be provided to the current interactive session. Where the customized dialogue output may be substitute or replacement audio, such audio may be played in the current interactive session in place of or to supplement the user-generated audio that was identified as a dialogue trigger. Because prediction may be used to identify a dialogue trigger, the associated customized dialogue output may be generated and provided to the interactive session in real-time or near real-time with detection of the dialogue trigger.

Figure 4:
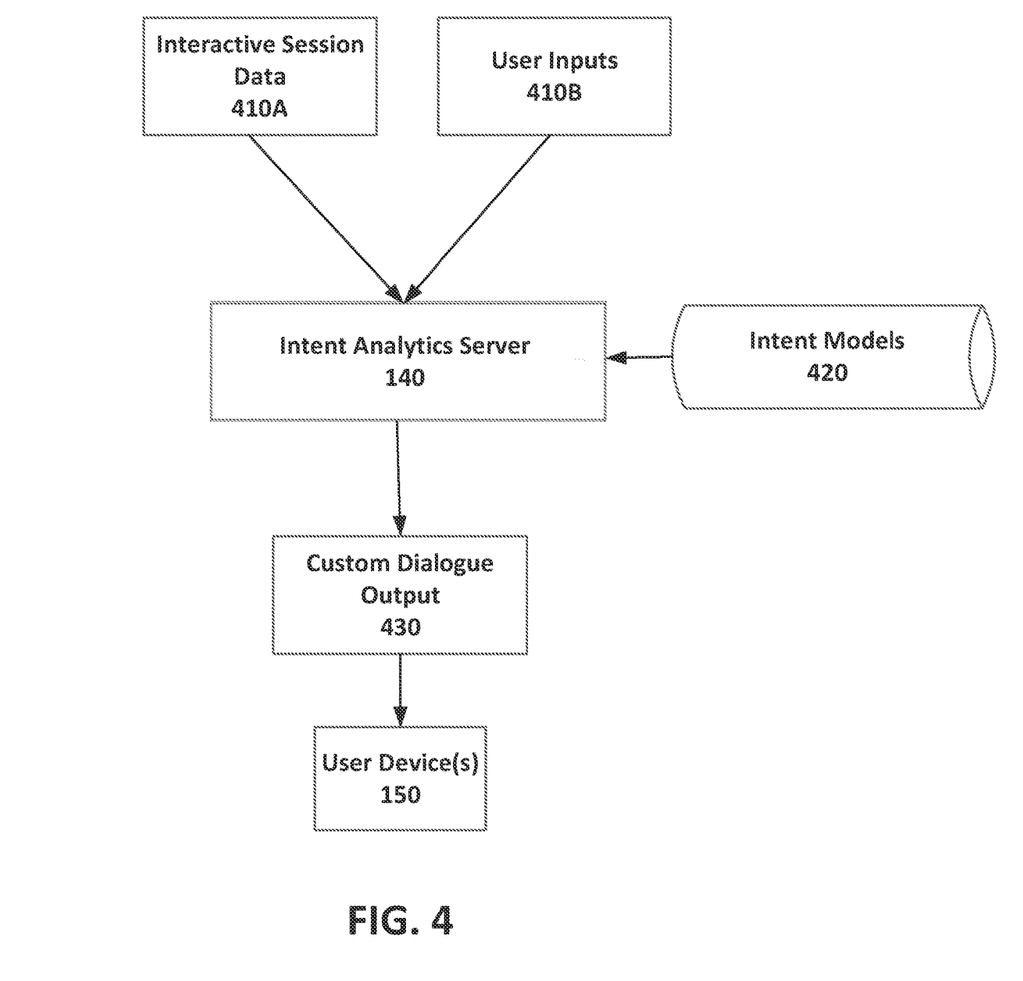
FIG. 4 is a diagram illustrating an exemplary implementation of intent identification for customized dialogue support in virtual environments.

FIG. 4 is a diagram illustrating an exemplary implementation of intent identification for customized dialogue support in virtual environments. As illustrated, different data streams 410A-B associated with a current interactive session of a user device may be provided to intent analytics server 140 for analysis and processing. Interactive data stream 410A may be associated with an interactive content title and include regarding with play of that interactive content title, which may be used to interpret and detect dialogue triggers. User inputs 410B may be associated with various input actions by the user of the user device 150 and captured by one or more associated input devices. The user inputs 410B may be analyzed by intent analytics server 140 in conjunction with the interactive session data 410A and one or more dialogue intent models 420 to assess and detect intents associated with dialogue triggers and to generate customized dialogue output from a subset of available dialogue outputs that have been filtered based on intent.

Intent analytics server 140 may select and obtain the dialogue intent model(s) from one of the databases 160 based on characteristics of the user or the game title of the current interactive session. Using the selected dialogue intent model(s), intent analytics server 140 may analyze various session parameters that occur concurrently across the different data streams 410A-B. For example, in-game event data from interactive data stream 410A may be occurring concurrently with voice audio and gestures from user input stream 410B. Data from the different streams may be analyzed by the intent analytics server 140 to identify what intent is being indicated when a dialogue trigger is received. The intent analytics server 140 may further identify and retrieve the dialogue filters specified by the dialogue intent model(s) in association with the identified intent. The identified dialogue filter may then be executed by intent analytics server 140 to filter available dialogue outputs associated with current conditions at the point in time that the dialogue trigger was identified. As a result, a subset of the available dialogue outputs may be determined and used to generate one or more custom dialogue outputs 430. The custom dialogue output 430 may then be provided to current interactive session, which may include one or more other user devices, in-game characters, elements, objects, or artificially intelligent command recipients.

Figure 5:
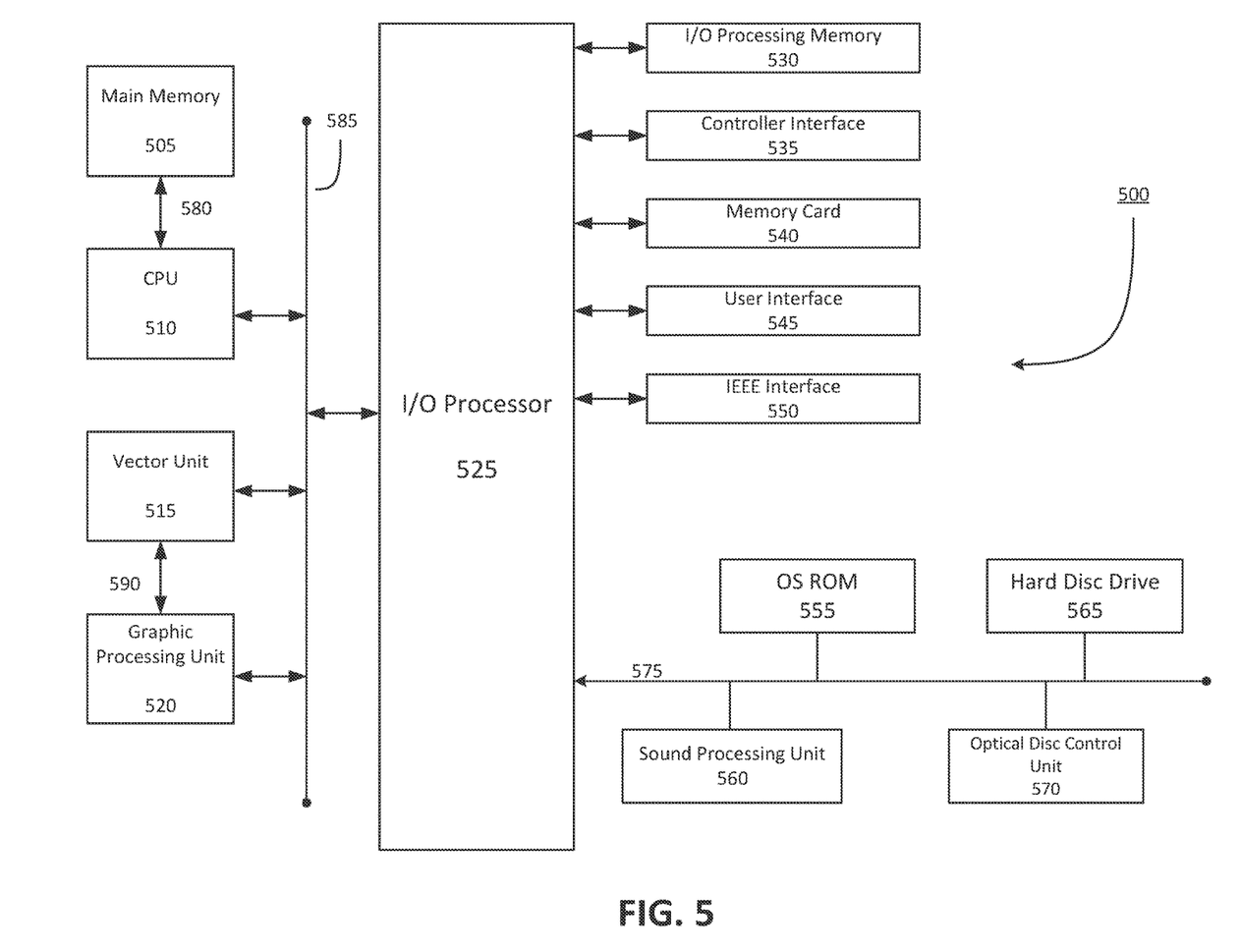
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of intent identification for customized dialogue support in virtual environments, the method comprising:
storing one or more dialogue intent models associated with different communication patterns in memory including a dialogue intent model customized to a user of a user device and specifying a dialogue filter applicable to predict one or more dialogue output intents of the user during interactive sessions of an interactive title;
receiving input data from the user device of the user, wherein the input data is captured during a stream of an interactive session of the interactive title that provides a virtual environment to the user device;
analyzing the input data based on the customized dialogue intent model;
predicting when a dialogue trigger is likely to occur within the interactive session stream based on the input data corresponding to one of the stored dialogue output intents;
applying the dialogue filter specified by the customized dialogue intent model to a plurality of available dialogue outputs associated with the stored dialogue output intents; and
generating a customized dialogue output in accordance with a filtered subset of the plurality of available dialogue outputs, the customized dialogue output provided at a portion of the interactive session stream predicted to include the dialogue trigger.

2. The method of claim 1, wherein the input data is captured by one or more input devices associated with the user device, each input device configured to capture at least one of a plurality of different input entry types indicative of different dialogue output intents.

3. The method of claim 2, wherein analyzing the input data includes identifying at least one of the input entry types in the input data, and wherein the customized dialogue output corresponds to the at least one of the input entry types.

4. The method of claim 2, wherein each of the input entry types corresponds to a different one of the dialogue output intents associated with the one or more dialogue intent models.

5. The method of claim 4, wherein the input data includes a plurality of the different input entry types, and wherein applying the dialogue filter includes applying a plurality of dialogue filters corresponding to the different input entry types in the input data.

6. The method of claim 5, wherein each of the dialogue filters corresponds to a preset dialogue file, and wherein applying the plurality of dialogue filters includes combining a plurality of present dialogue files.

7. The method of claim 2, wherein one of the input devices includes a camera that tracks a gaze direction of the user during the interactive session, and further comprising identifying the dialogue filter based on a location within the virtual environment to which the gaze direction is oriented when the dialogue trigger is predicted.

8. The method of claim 2, wherein one of the input devices includes a camera or sensor that tracks a gesture of the user during the interactive session, and further comprising identifying the dialogue filter based on a location within the virtual environment associated with the gesture when the dialogue trigger is predicted.

9. The method of claim 1, wherein the input data is associated with an object within the virtual environment, and further comprising identifying the dialogue filter based on the associated object.

10. The method of claim 1, further comprising refining at least one of the one or more dialogue intent models stored in memory based on feedback from the user device, wherein the refined model is used to analyze subsequent input data.

11. A system for intent identification for customized dialogue support in virtual environments, the system comprising:
memory that stores one or more dialogue intent models associated with different communication patterns including a dialogue intent model customized to a user of a user device and specifying a dialogue filter applicable to predict one or more dialogue output intents of the user during interactive sessions of an interactive title;
a communication interface that communicates over a communication network, wherein the communication interface receives input data from the user device of the user, wherein the input data is captured during a stream of an interactive session of the interactive title that provides a virtual environment to the user device; and
a processor that executes instructions stored in memory, wherein the processor executes the instructions to:
analyze the input data based on the customized dialogue intent models;
predicting when a dialogue trigger is likely to occur within the interactive session stream based on the input data corresponding to one of the stored dialogue output intents;
apply the dialogue filter specified by the customized dialogue intent model to a plurality of available dialogue outputs associated with the stored dialogue output intents; and
generate a customized dialogue output in accordance with a filtered subset of the plurality of available dialogue outputs, the customized dialogue output provided at a portion of the interactive session stream predicted to include the dialogue trigger.

12. The system of claim 11, wherein the input data is captured by one or more input devices associated with the user device, each input device configured to capture at least one of a plurality of different input entry types indicative of different dialogue output intents.

13. The system of claim 12, wherein the processor analyzes the input data to identify at least one of the input entry types in the input data, and wherein the customized dialogue output corresponds to the at least one of the input entry types.

14. The system of claim 12, wherein each of the input entry types corresponds to a different one of the dialogue output intents associated with the one or more dialogue intent models.

15. The system of claim 14, wherein the input data includes a plurality of the different input entry types, and wherein the processor applies the dialogue filter by applying a plurality of dialogue filters corresponding to the different input entry types in the input data.

16. The system of claim 15, wherein each of the dialogue filters corresponds to a preset dialogue file, and wherein the processor applies the plurality of dialogue filters by combining a plurality of present dialogue files.

17. The system of claim 12, wherein one of the input devices includes a camera that tracks a gaze direction of the user during the interactive session, and wherein the processor executes further instructions to identify the dialogue filter based on a location within the virtual environment to which the gaze direction is oriented when the dialogue trigger is predicted.

18. The system of claim 12, wherein one of the input devices includes a camera or sensor that tracks a gesture of the user during the interactive session, and wherein the processor executes further instructions to identify the dialogue filter based on a location within the virtual environment associated with the gesture when the dialogue trigger is predicted detected.

19. The system of claim 11, wherein the input data is associated with an object within the virtual environment, and wherein the processor executes further instructions to identify the dialogue filter based on the associated object.

20. The system of claim 11, wherein the processor executes further instructions to refine at least one of the one or more dialogue intent models stored in memory based on feedback from the user device, wherein the refined model is used to analyze subsequent input data.

21. A non-transitory, computer-readable storage medium, having embodied thereon a program executable by a processor to perform a method of intent identification for customized dialogue support in virtual environments, the method comprising storing one or more dialogue intent models associated with different communication patterns in memory including a dialogue intent model customized to a user of a user device and specifying a dialogue filter applicable to predict one or more dialogue output intents of the user during interactive sessions of an interactive title;

receiving input data from the user device of the user, wherein the input data is captured during a stream of an interactive session of the interactive title that provides a virtual environment to the user device;

analyzing the input data based on the customized dialogue intent models;

predicting when a dialogue trigger is likely to occur within the interactive session stream based on the input data corresponding to one of the stored dialogue output intents;

applying the dialogue filter specified by the customized dialogue intent model to a plurality of available dialogue outputs associated with the stored dialogue output intents; and generating a customized dialogue output in accordance with a filtered subset of the plurality of available dialogue outputs, the customized dialogue output provided at a portion of the interactive session stream predicted to include the dialogue trigger.

* * * * *